INVENTORS
JOHN E. CARROLL
KENNETH A. GOLONKA
BY
Meyer, Tilberry & Body
ATTORNEYS.

INVENTORS
JOHN E. CARROLL
KENNETH A. GOLONKA
BY
Meyer, Tilberry & Body
ATTORNEYS.

United States Patent Office 3,505,587
Patented Apr. 7, 1970

3,505,587
ELECTRIC ARC WELDING POWER SUPPLY
John E. Carroll, Lyndhurst, and Kenneth Anthony Golonka, Richmond Heights, Ohio, assignors to The Lincoln Electric Company, Cleveland, Ohio, a corporation of Ohio
Filed May 31, 1968, Ser. No. 733,497
Int. Cl. H02p 9/14
U.S. Cl. 322—25     22 Claims

ABSTRACT OF THE DISCLOSURE

A power supply for electric arc welding wherein the volt ampere characteristics are controlled by regulator means for varying the current through a D.C. field coil. For a drooping volt-ampere curve, the means senses the current in the D.C. coil and maintains this current essentially constant with heating of the coil. For a transformer type power source, the means additionally senses the A.C. line voltage and inversely varies the current in the coil to compensate for any variations in the line voltage.

For a flat volt-ampere curve rotating generator, the same means senses the output voltage and varies the current in the D.C. coil to maintain the output voltage essentially constant.

This invention pertains to the art of electric arc welding and more particularly to means for controlling or regulating the power supplied to an electric arc welding process.

Direct current power supplies for electric arc welding generally fall into two classifications, namely those which have a radially drooping voltage output with an increase in current and those which have a constant voltage output with an increase in current. The former is called a variable voltage supply and the latter is called a constant voltage power supply.

Variable voltage power supplies are generally used for stick welding and submerged arc welding applications. Constant voltage power sources are generally used for semi-automatic and automatic operations where the electrode is advanced toward the workpiece at a constant rate.

Variable voltage power supplies of the type to which this invention pertains comprise either: a transformer-saturable core reactor combination; or, a rotating D.C. generator consisting of an armature, D.C. excited shunt field coils and series differential field coils.

Such power supplies have a voltage output which varies from a maximum at open circuit to zero at short circuit along a definite and predeterminable curve. The current in turn increases from zero at open circuit to a maximum at short circuit. For a constant open circuit voltage, the shape or slope of this curve, i.e., the point where it intersects the zero voltage line may be changed by varying: in the case of a transformer-saturable core reactor combination, the current flowing in the field coil of the saturable core reactor; or, in the case of a rotating generator, by shunting some of the load current around the series differential field windings. The point where the curve intersects both the zero current and zero voltage lines may be shifted by changing the open circuit voltage of the power supply which in the case of the transformer is usually done by changing the ratio of the turns of the transformer or in the case of a rotating generator, by changing the excitation of the shunt field coils.

In variable voltage welding operations, the open circuit voltage is usually two to four times the actual arc welding voltage. For any open circuit voltage, the current in the arc is determined by the point where the ordinate of the actual arc voltage intersects the volt-ampere curve of the particular power source employed. Thus, as the open circuit voltage varies or as the current in the field coil of the saturable core reactor varies, the point where the arc voltage ordinate intersects the volt-ampere curve will also vary and the current in the arc will vary. Such current variations can adversely affect the quality of a weld.

Constant voltage power supplies of the type to which this invention pertains have heretofore consisted of an armature, shunt field coils and series compound field coils. The arc voltage is determined by adjusting the output voltage of the generator and the current is adjusted by varying the rate at which the electrode is fed toward the workpiece. The output voltage of the generator is adjusted by varying the D.C. exciting current in the shunt field windings. The series compound field coils add to the magnetomotive force of the shunt field coils as the load current increases to compensate for I R loses in the armature, commutation losses and armature reaction. In such constant voltage generators, while the actual voltage during welding is desirably the same s the open circuit voltage, this is not always the case because of the difficulty of flat compounding a rotating generator for all open circuit voltages. A generator which has a flat volt-ampere curve at one open circuit voltage will generally have a slightly rising volt-ampere curve for lower open circuit voltages and a slightly drooping volt-ampere curve for the higher open circuit voltages.

In the field of electric arc welding: as lineal welding speeds have increased; as the amount of metal deposited per unit of time has increased; or as the welder attempts out-of-position welding, the arc voltage and the arc current have become quite critical. Thus, in constant voltage welding using cored type electrodes, if the arc voltage is too high, porosity becomes a problem. If the voltage is too low, the weld bead tends to have a humped or roped appearance. Also stubbing occurs. In out-of-position welding, if the voltage is too high, the weld pool is hotter, more fluid and will not remain in position under the force of gravity. Also, there is the danger of burning through the relatively thin sheet metal which is often encountered in out-of-position welding. If the voltage is too low, poor or no fusion results. In other words, modern welding requires that the power supply characteristics and/or the electrode feed rate be "tuned" one to the other so that the proper arc voltage and arc current is always at the optimum value.

In the past, the welding operator has always experienced the difficulty that there are several parameters over which he had no control, which parameters vary during a welding process and upset the most carefully "tuned" welding process, necessitating "retuning."

The main parameter and the one with which the present invention primarily deals is the change in the internal resistances of the power supply due to heating because of the high currents flowing through the various coils. Any one power source will normally ultimately reach a stable point where the heat is dissipated at a rate equal to the rate that the heat is being generated. If the power supply is then "tuned," the welding process will proceed without further difficulty. However, when the welding process is shut down over night or even for lunch, the power source cools and must again be "retuned."

The problems of heating in a rotating generator are cumulative. As the main generator armature heats, its resistance increases resulting in a greater voltage drop when the current is flowing. To compensate for this, a greater shunt field current is required. However, at the same time that the armature heats, the shunt field windings also heat and their resistance increases such that if the excitation voltage remains constant, the field current actually goes down. This decrease is further aggravated by the fact that the field coil exciting generator also heats and its output voltage instead of remaining constant (or increasing as it should to compensate for field coil heating) goes down. The result is a wide and progressive change in the open circuit voltage such that the welding operator must continuously readjust his field excitation as the day progresses and his generator heats and even cools, e.g., over the lunch period.

The second uncontrollable parameter with which the present invention deals is line voltage variations. These are more a problem with transformer type power sources than with rotating generators. Thus with the former the open circuit voltgae varies in direct proportion to the line voltage variations. With the latter, the rotational speed is a direct function of the line frequency and only to a minor extent is affected by line voltage. However line voltage variations make it undesirable to use transformer-rectifier type exciters for the shunt field coils. Instead, the shunt field windings are usually energized by a small rotating generator mounted on the same shaft as the main generator which rotates at a generally constant speed.

A further problem with rotating generators has been that the same generator cannot be used for variable voltage and constant voltage arc welding. The characteristics of the two machines are so different that separate generators had to be designed and manufactured for either type of output. It would appear that a variable voltage generator could be used as a constant voltage generator simply by appropriately changing the series field coils and reducing the field excitation to give the lower open circuit voltage required by constant voltage welding. The result, however, is that the field excitation is in the linear portion of the magnetization curve of the field core and the design and adjustment of the series cumulative field coils to compensate for the many variables, such as: retarding and advancing commutation; armature reaction; and, armature resistance become extremely critical, if not impossible. Further, the method of compensating for the effects of these variables is radically different in the two types of generators.

The present invention contemplates an arc welding power source having a D.C. energized field coil for controlling or changing its volt-ampere curve in combination with means for energizing the coil which will keep the power source always "tuned" to the welding operation to be performed regardless of such heating or line voltage variations and which is simple and automatic in operation.

In accordance with the present invention, when the power source is a transformer-saturable core reactor combination or a drooping volt-ampere curve generator, the energizing means includes means for adjustably energizing the D.C. field coil with a desired average voltage, means for sensing the current in the coil at this voltage and means for automatically varying the average voltage across the terminals of the coil to maintain the coil current and thus the arc volts and amperes essentially constant as the coil heats.

Further, in accordance with the invention, with a transformer-saturable core reactor combination, the energizing means includes means for sensing the line voltage and for additionally varying the average voltage supplied to the D.C. field coil to further change the shape of the volt-ampere curve to compensate for such line voltage variations.

Further in accordance with the invention, with a constant potential or flat volt-ampere curve generator, the energizing means includes means for sensing the output voltage and varying the voltage supplied to the field coil so that the output voltage remains essentially constant.

Further in accordance with the invention, the same energizing means may be used for energizing the D.C. saturating coil on a reactor and sensing either the coil current or output voltage, or the shunt field coils on either a constant potential or a variable voltage generator and sensing either the coil current or output voltage.

Further, in accordance with the invention, there is provided for use with a rotating generator having series differential coils, the improvement which comprises: selector means for selectively placing such coils in or out of series with the armature and the load; energizing means for adjustably energizing the D.C. shunt field coil with a voltage to produce the desired open circuit voltage and including voltage sensing means and amplifying means for the sensed voltage operable on the energizing means for automatically varying the shunt field coil voltage to maintain the sensed voltage essentially constant; and, other selector means for selectively connecting said sensing means to sense either the generator output voltage when the series differential coils are not in series with the load or to sense the shunt field current when such coils are in series with the load whereby the same generator and shunt field coil energizing means may be used selectively for constant potential or variable voltage arc welding.

Further, in accordance with the invention, a power supply for arc welding is provided comprised of a variable voltage direct current generator having shunt field coils and an armature with an open circuit voltage at full field excitation on the order of 80–110 volts and differential field coils in series with the armature and the load in combination with means for supplying an adjustable voltage to the terminals of the shunt field coils to produce a desired open circuit voltage, and means for sensing the shunt field coil current and automatically varying the voltage at the shunt field coil termianls to maintain the shunt field coil current essentially constant at any adjusted value.

Further in accordance with the invention, this variable voltage generator includes means for converting it to a constant voltage generator with an output voltage less than 60 volts by connecting the armature directly to the load (e.g., by bypassing the series differential field coils) in combination with means for sensing the output voltage and automatically varying the voltage across the shunt field coil terminals to maintain the voltage across the armature terminals constant despite load variation.

Thus, usually series differential coils are employed only for variable voltage welding. For constant voltage welding no series coils are used although the invention does ont exclude the use of same if desired.

In the design of the means for supplying and regulating the shunt field coil current, difficulty was experienced in stabilizing same. In accordance with the present invention this problem was overcome by providing a small resistance in series with the shunt field coil, sensing the voltage across such resistance for a control signal and placing across the resistance and shunt field coil in series, a diode so polarized that the voltage generated by the collapse of the magnetic field will be dissipated by a current flowing through the diode, resistor and field coil which has the effect of filtering the pulses supplied from silicon controlled rectifiers through the sensing resistor.

The principal object of the invention is the provision of a new and improved power supply for electric arc welding which will remain "tuned" to the arc welding process with heating of the power supply and/or line voltage variations.

Another object of the invention is the provision of a new and improved power supply for electric arc welding including a variable voltage generator which will have a generally constant volt-ampere curve with heating and cooling of the generator coils.

Another object of the invention is the provision of a new and improved rotating generator for constant voltage welding which does not require the use of series compound coils and which will have a flat volt-ampere curve within the tolerances required by modern electric arc processes.

Still another object of the invention is the provision of a new and improved transformer-saturable core reactor power supply for electric arc welding wherein variations in line voltage and variations in the resistance of the field coil of the saturable core reactor are automatically compensated for so that the current in the arc will remain constant despite such line voltage variations or heating.

Still another object of the invention is the provision of a new and improved transformer-saturable core reactor type power supply for electric arc welding wherein the shape of the volt ampere curve is changed to compensate for line voltage variations so that the arc current will remain constant notwithstanding such line voltage variations.

Still another object of the invention is the provision of a new and improved single power supply which will selectively supply electric energy to either a variable voltage or constant voltage electric arc welding load with improved stability and regulated characteristics.

Another object of the invention is the provision of a new and improved regulator for the shunt field coil of electric generators supplying current to an electric arc welding process which will selectively either automatically hold the shunt field coil current constant regardless of variations in the resistance of the shunt field coil, the input voltage or other parameters; or, will automatically vary the field current to maintain the output voltage of the generator constant.

The invention may take physical form in certain parts and arrangement of parts, preferred embodiments of which will be described in detail in this specification and illustrated in the accompanying drawings which form a part hereof and wherein.

Figure 1:
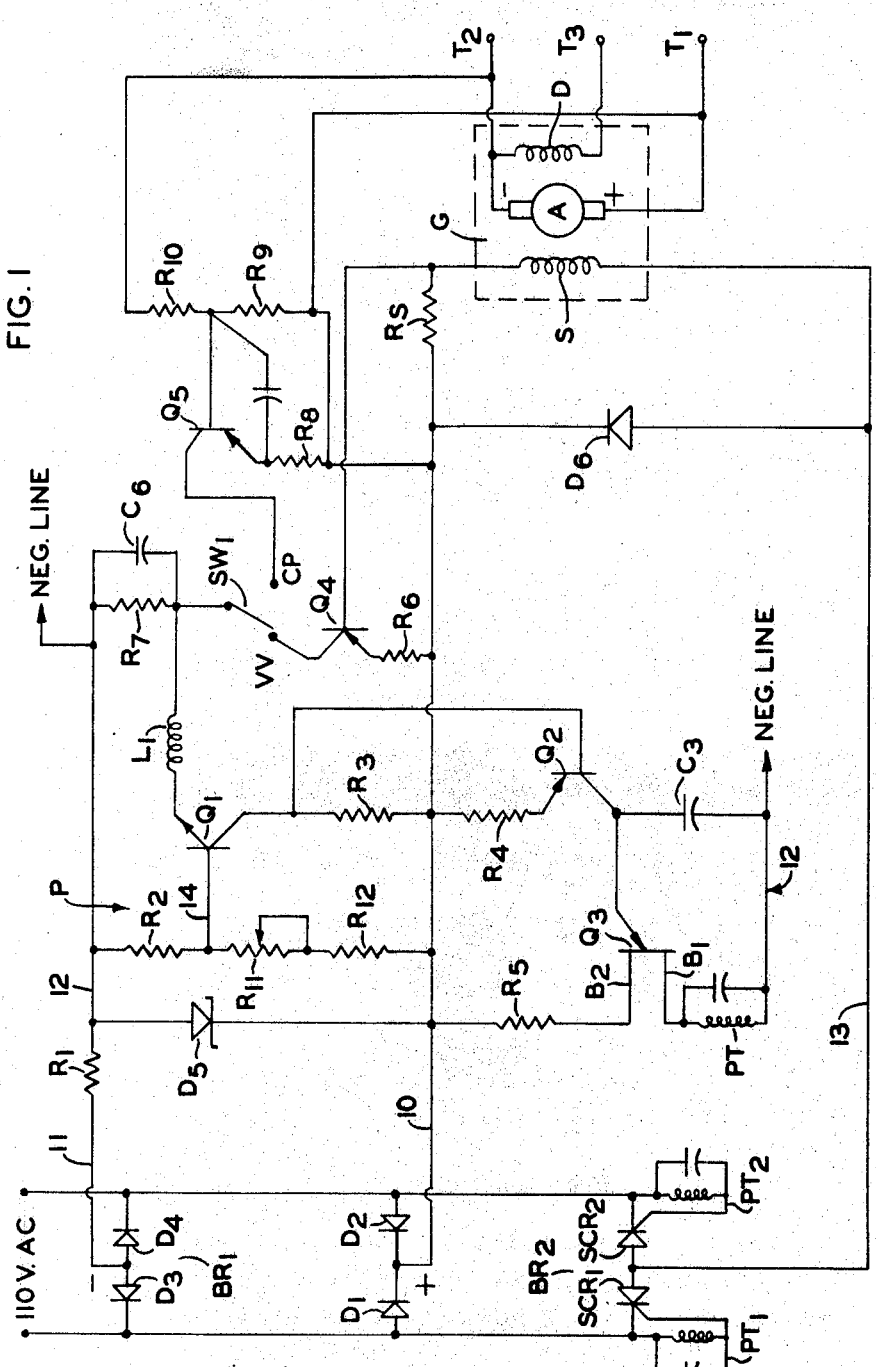
FIGURE 1 shows a circuit diagram of an electric arc welding power supply using a rotating generator illustrating a preferred embodiment of the invention.

Referring now to the drawings wherein the showings are for the purposes of illustrating a preferred embodiment of the invention only and not for the purposes of limiting same, FIGURE 1 shows schematically a rotating welding generator G including an armature A, a differential series field winding D, and a shunt field winding S energized by an adjustable power source P which automatically controls the energization so as to either: maintain the output voltage of the generator constant with load variations; or, maintain a constant open circuit voltage with temperature and line voltage variations, depending upon the position of a control switch SW1 in either the CP or VV position, respectively.

The generator of the preferred embodiment is relatively conventional for what is known as variable voltage welding wherein the voltage output decreases with an increase in load but is not conventional for what is known as constant potential welding wherein the output voltage remains substantially constant with increases in load.

Thus, for variable voltage output, the shunt field coils are energized from the power source P with a voltage across the terminals to produce a current such that the shunt field may be excited to a saturation factor of approximately 1.3 giving an open circuit voltage of between 80 and 110 volts. However, for constant voltage output, the coils are energized such that there is no saturation in the magnetic path and the output voltage may be anywhere from 15 to 60 volts. Also as will appear, for constant voltage output the series differential field winding is not used although the invention does not preclude its use nor does it preclude the use of cumulative series turns. Thus, one terminal of armature A connects directly to terminal T1 which is the common or workpiece output terminal. The other terminal of the armature A connects both: to terminal T2, which is the constant potential terminal; and to terminal T3, which is the variable voltage terminal, through the series differential winding D. This winding is so polarized that the current through the winding generates an M.M.F. in opposition to the M.M.F. of the shunt field winding S and causes a reduction in the voltage output with an increase in current. The polarity of the output terminals may be as desired.

The power source P includes a bridge rectifier BR2 comprised of diodes D1, D2, and silicon controlled rectifiers SCR1 and SCR2 having: its input terminals connected to the 110 volt A. C. supply line; its negative output terminal connected directly to one terminal of the generator field winding S through wire 13; and, its positive output terminal connected to wire 10, which wire 10 is connected to the other terminal of the generator field winding S through resistor $R_s$. Diodes D1 and D2 are shared both with the rectifier BR1 for energizing the control circlit and with the rectifier BR2 for energizing the generator field.

The output voltage of rectifier BR1 is fed through resistor R1 to a Zener diode D5, which may have any desired operating voltage but which in the preferred embodiment is 20 volts. This Zener diode voltage also appears across resistor R2, variable resistor R11, and resistor R12 in series from wire 12 to wire 10. By varying resistor R11 the voltage on wire 14, which is the common wire between resistors R2 and R11, can be varied relative to wire 10. This voltage is a regulated reference voltage and is fed to the base of transistor Q1 forming a comparator amplifier as will appear.

The collector of transistor Q1 is connected to wire 10 through resistor R3 and the voltage across resistor R3 serves as the forward bias for transistor Q2, a PNP type transistor. The emitter of transistor Q2 is connected to wire 10 through resistor R4 while the collector of transistor Q1 is connected directly to the base of transistor Q2. Transistor Q2 sets the charging rate on a capacitor C3 connected between its collector and wire 12. The collector of Q2 and thus one terminal of capacitor C3 is also connected to the emitter of a unijunction transistor Q3. Base 2 of unijunction transistor Q3 is connected through resistor R5 to wire 10. As soon as the voltage from the emitter to base 1 of the unijunction transistor Q3 has reached the breakdown voltage of this transistor, the unijunction transistor breaks down and discharges the energy of C3 through the primary of a pulse transformer PT. The two secondaries of this transformer PT1, PT2, are connected to the gates of silicon controlled rectifiers SCR1, SCR2, and make the gates more positive than the cathode causing these silicon controlled rectifiers to switch into a conductive state in turn as each is forward biased and supply voltage to the field S on the generator. The charging rate on condenser C3 sets the percentage of the remainder of each 180° half-cycle voltage that these silicon controlled rectifiers SCR1, SCR2 are conducting. Since this voltage is in the form of short pulses less than one-half cycle they tend to generate opposite polarity transients across the field coil. In accordance with the invention, diode D6 is connected across resistor $R_s$ and the field coil terminal which damps out these transients and levels out the voltage drop across $R_s$.

In accordance with the invention, the input to comparator amplifier Q1 can come from either of two sources; namely, the generator output voltage, that is the voltage across terminals T1, T2, or the generator field current. In the latter case, the generator field current flows through resistor $R_s$ and the resultant voltage appears across the base and emitter of transistor Q4 in series with resistor R6. The collector of transistor Q4 is connected to the VV terminal of switch SW1 and then through a radio frequency choke L1 to the emitter of transistor Q1. Also, the collector is connected to the negative line 12 through resistor R7 and capacitor C6 in parallel. Thus, as the voltage across resistor $R_s$ varies, this voltage is amplified by transistor Q4 and compared with the reference voltage on wire 14 by the comparator amplifier Q1, which amplifier then feeds any differences in the two voltages to transistor Q2 which in turn controls the firing of unijunction transistor Q3 which in turn controls the firing angle of the silicon controlled rectifiers SCR1, SCR2 and the current in the generator field coil S is varied so as to bring the two voltages back so as to be essentially equal.

Further in accordance with the invention, when it is desired to regulate the output voltage of the generator and hold it constant, this output voltage is fed to a voltage divider comprised of resistors R9 and R10 in series and the voltage across R9 is fed to the base of transistor Q5, the emitter of which is connected through resistor R8 to the wire 10 and the collector of which is connected to the emitter of transistor Q1 through the CP terminal of switch SW1 and the choke L1. This emitter is also connected to line 12 through resistor K7 and capacitor C6 connected in parallel. Thus, as the voltage across terminals T1, T2 tends to vary, these variations are fed to the comparator amplifier Q1 which then controls, as before described, the firing angle of the silicon controlled rectifiers SCR1, SCR2 to change the field excitation which in turn changes the output voltage so that the portion of this output voltage as amplified by transistor Q5 assumes a balanced condition with the reference voltage on wire 14.

It will be obvious that as the reference voltage in the wire 14 is varied, the firing angle of the silicon controlled rectifiers SCR1, SCR2 will be varied to provide the requisite voltage at the terminals T1, T2 or the desired field current in the generator field winding S depending on the position of SW1.

It is to be noted that using the arrangement shown, variations in the line or input voltage to the power source P will not result in any changes in the generator field coil current. Also when the switch SW1 is in the CP position, variations in the load current on the generator will be fully compensated for by changes in the generator field excitation so that this output voltage will remain constant. In a like manner, when the switch SW1 is in the VV position, variations in the internal resistance of the generator shunt field winding S due to heating will be fully compensated for and the generator field current will remain constant and thus its open circuit voltage will remain constant.

In essence, the control circuit derives a voltage from either the output of the generator or from the field current, amplifies such voltage, compares the amplified voltage with an adjustable voltage derived from a constant potential source, amplifies the differences between the amplified voltage and the reference voltage, uses this amplified difference to control the firing of a unijunction transistor type relaxation oscillator and uses pulses derived from the oscillator to control the conduction angle of silicon controlled rectifiers which are connected to energize the generator field coil current.

It is also possible to connect resistors R9 and R10 across terminals T1, T3 and thus so regulate the generator field current that the output voltage between terminals T1, T3 will remain constant notwithstanding the series differential effect of the differential winding D. Such an arrangement is described in the copending application of Theodore Ashton et al., Ser. No. 678,094, filed Oct. 25, 1967. A generator having a static flat volt-ampere curve with the dynamic characteristics of a drooping volt-ampere curve results.

Using the invention it will be seen that for constant voltage output, a feedback loop is established from the generator output to the generator field coils which holds the generator output voltage constant to any preset value within the voltage ranges of the generator for any variation in current within the maximum current rating of the generator. This may be distinguished from previous constant potential generators having series cumulative field coils where the voltage curve might be flat for one preset output voltage; but is normally rising or drooping, or both, for other output voltages. A further result of the invention is the ability to calibrate a dial cooperating with the control knob for varying resistor $R_{11}$ in "volts" and the generator will always assume this voltage at any loading. In some instances, the voltmeter often employed with welder power sources may be dispensed with. Such meters are expensive and easily damaged by conditions existent where welders are frequently used.

Further, using the invention for variable voltage output, a feedback loop is established from the generator field coil current to the source of such current so as to maintain this current constant regardless of internal temperature changes of the generator line voltage variations or otherwise.

Figure 2:
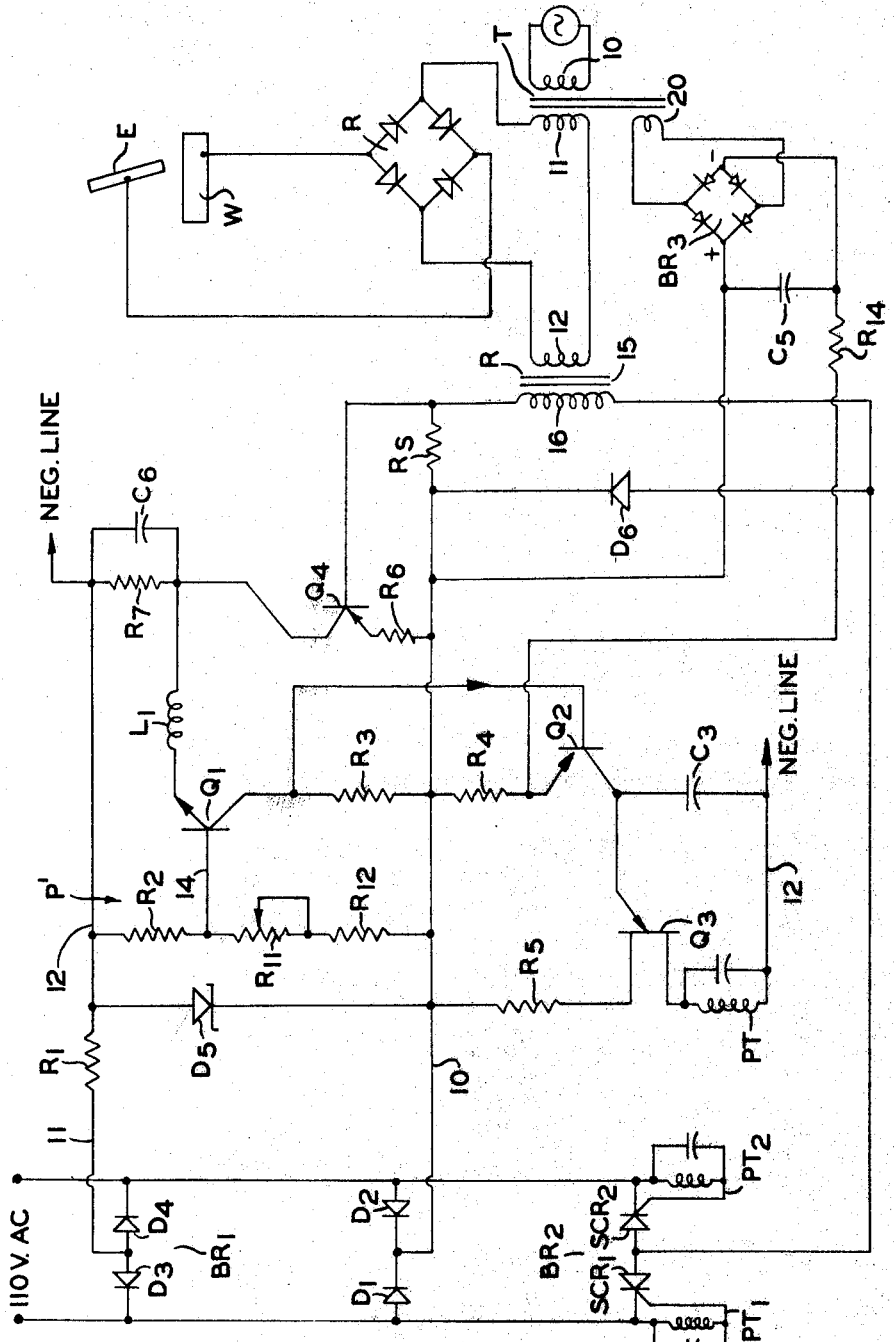
FIGURE 2 shows a circuit diagram of an electric arc welding power supply using a transformer and saturable core reactor illustrating an alternative preferred embodiment of the invenion.

FIGURE 2 shows an alternative embodiment of the invention including a transformer T having a primary 10 adapted to be connected to the electric power supply lines, and a secondary 11 adapted to be connected to the electrode E and workpiece W through the inductive winding 12 of a saturable core reactor R. Depending on whether the welding is to be either D.C. or A.C., a rectifier may or may not be used in series with the transformer secondary as is conventional. The saturable core reactor R includes a core 15 and a saturating field coil 16, which is energized from a power source P'.

The transformer T may take any known form, with its primary 10 being arranged for connection to 110, 200 or 440 volts supply lines, and its secondary having the appropriate turns ratio to the primary to supply the desired open circuit voltage. Also, as is conventional, this secondary or the primary windings may be tapped so as to vary the open circuit voltage. The transformer T in accordance with the invention also has a second secondary winding 20.

The saturable core reactor R may also be of any known or desired construction so that winding 12 has, when the core is unsaturated, an inductance to provide the desired maximum droop in the volt-ampere curve of the power source. Taps may be provided on this winding 12 if desired. The core 15 of this reactor R likewise may be of any known or desired construction, such that when there is no current flowing in the field coil 16 at least the desired maximum amount of inductance will be provided in series with the transformer, and so that when a direct current is passed through the coil 16, the amount of inductance of the reactor may be reduced by an amount to permit the maximum welding current of the transformer.

The power source P' is generally identical to that of the power source P of FIGURE 1 except that in accordance with the invention, the input to the control circuit comes from two sources. The first source is the input to the comparator amplifier Q1 which comes from the saturating coil current. The resultant voltage appears across the base and emitter of transistor Q4 in series with resistor R6. The collector of transistor Q4 is connected through a radio frequency choke L1 to the emitter of transistor Q1. Also, the collector is connected to the negative line 12 through resistor R7 and capacitor C6 in parallel. As the voltage across resistor $R_s$ varies, this variation is amplified by transistor Q4 and compared with the reference voltage on wire 14 by the comparator amplifier Q1, which amplifier then feeds any differences in the two voltages to transistor Q2 which in turn controls the firing of unijunction transistor Q3 which in turn controls the firing angle of the silicon controlled rectifiers SCR1, SCR2 and the current in the saturating winding is varied so as to bring the two voltages back so as to be essentially equal. In effect, the current in coil 16 is held constant notwithstanding changes in its resistance. The inductance of coil 12 is thus held constant despite heating or cooling of the reactor R.

The second source modifies the control for line voltage variations. A signal derived from the transformer T is superimposed on the control signal for holding the saturating coil current constant so as to vary the current in amounts inversely proportional to line voltage variations.

The signal from the line voltage may be derived in a number of different ways, e.g., by taps on windings 10 or 11, but in the embodiment shown by the second secondary winding 20. The voltage, however obtained, is rectified by a full wave rectifier $BR_3$, filtered by capacitor $C_5$ and the voltage divided between resistor $R_{14}$ and resistor $R_4$. The voltage across $R_4$ varies the bias on transistor $Q2$ and negates the bias variations from transistor $Q1$ resulting in a variation in the field winding current as a result of line voltage variations.

Using the arrangement shown, variations in the line or input voltage to the power source P' will not result in any changes in the saturating winding current. However, variations in the internal resistance of the saturating coil 16 due to heating will be fully compensated for and the saturating coil current will remain constant and thus the reactance of winding 12 will remain constant. This coil current is then varied in inverse proportions to the line voltage variations to transformer T such that as the line voltage decreases, the saturating current increases, the reactance of winding 12 decreases and the shape of the volt-ampere is changed so that the curve crosses the desired arc voltage ordinate at the same arc current.

In essence, the control circuit monitors two functions and adjusts the saturating current of the saturable reactor to compensate for any variation in these two functions. First a voltage proportional to the current in the control winding is monitored, amplified, compared against a pre-set voltage from a constant potential source, and used to control the firing of the unijunction transistor relaxation oscillator. Secondly a voltage proportional to the line voltage is applied to the control circuit for the unijunction transistor relaxation oscillator and added algebraically to the first voltage function. The oscillator controls the saturating current of the saturable reactor control coil by varying the conduction angle of the silicon controlled rectifier.

Figure 3:
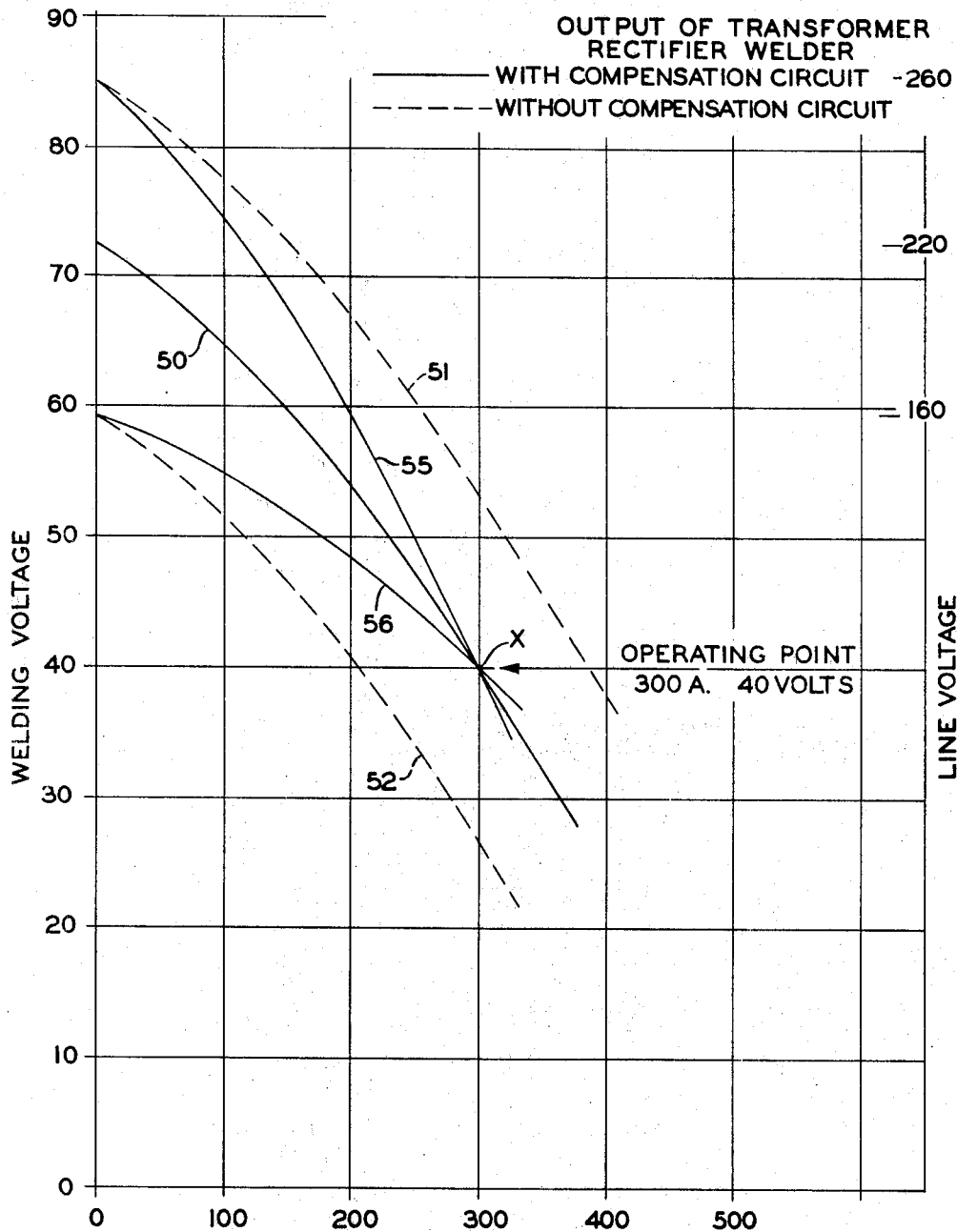
FIGURE 3 is a graph showing typical volt-ampere curves of the prior art and of the embodiment shown in FIGURE 2.

The results of the invention can be seen by referring to the voltampere curves shown in FIGURE 3, which is for a transformer T having a nominal input voltage of 220 volts and a turns ratio between the primary and secondary, such as to have an output voltage of 72.5 volts. As is known, the shape of the voltampere curve from this open circuit voltage will vary depending upon the inductance of the saturable core reactor. Curve 50 shows a typical drooping voltampere curve. The voltage across the arc is determined by the shielding medium employed and the current is determined by where the voltage ordinate intersects the curve 50. On the curve 50 the arc voltage is 40 and the corresponding current is 300 amperes.

Assuming no changes in the inductance of the saturable core rector R, if the line voltage should increase from 220 volts to 260 volts, the open circuit voltage increases to 86.6 and the voltampere curve is indicated by 51, it being noted that curve 50 and curve 51 are substantially parallel. If the line voltage should drop to 180 volts, the open circuit voltage of the power source will drop to approximatetly 59.4 volts, and the voltampere curve in the absence of the invention is indicated by the curve 52. In either event, because the arc voltage is fixed at approximately 40 volts, it will be seen that the current when the line voltage goes up to 260 volts, will increase to an amount in excess of 380 amperes. If the line voltage drops to 180 volts, the current will drop to a value, as indicated by curve 52, of about 210 amperes. In either event, the welding conditions have radically changed.

Using the present invention, however, when the line voltage increases to 260 volts the power source P' automatically reduces the amount of current in the saturating coil 16 resulting in the inductance of the saturable core reactor increasing, which increases the steepness of the voltampere curve, as shown by curve 55, so that at the 40 volt welding point the current will remain exactly the same. By the same token, if the line voltage drops to 180 volts the current in the saturating coil 16 is increased resulting in a decrease in the inductance of the reactor R, and the voltampere curve becomes less steep, as shown by curve 56, such that it will continue to pass through the desired operating point of 40 volts and 300 amperes.

The power source P' thus prevents any change in the current in coil 16 as it heats or cools and at the same time changes this current in amounts sufficient to change the slope of the voltampere curve so as to compensate for line voltage variations. The welder is thus unaware that there has been a change in the line voltage or the temperature of the saturating field coil.

This power source P' can be arranged so that instead of sensing the coil current, the output voltage is sensed as was done with the embodiment of FIGURE 1. With such an arrangement the static output voltage curve would be flat and the dynamic curve that of a variable voltage machine.

Using the present invention, satisfactory welds can now be obtained notwithstanding line voltage variations, either gradual throughout the course of a day as various machine tools are placed on and off the load as the temperature of the conductors changes, or due to voltage surges, either up or down, as various motors are thrown on and off the load. Also, it is unnecessary for the operator to readjust the saturating current to compensate for heating or cooling of the coils in the power supply.

The invention has been described with referenc to preferred embodiments. Obviously, modifications and alterations will occur to others upon a reading and understanding of the invention and it is our intention to include all such modifications and alterations insofar as they come within the scope of the appended claims or equivalent thereof.

Having thus described my invention, I claim:

1. An arc welding power source including:
   (a) a source of voltage at a welding current, the value of the output voltage and its relationship to the current being controlled by a D.C. energized field coil,
   (b) means for adjustably energizing said coil to a desired level of energization,
   (c) means for selectively sensing either the current in said coil or the output voltage of said source,
   (d) means amplifying a value proportional to the sensed value,
   (e) control means for applying said amplified value to said energizing means and varying same to maintain either the current in said coil or the output voltage of said source essentially constant.

2. The power source of claim 1 wherein said source is a rotating generator and said coil is the shunt field coil of said generator.

3. The power source of claim 2 wherein said generator includes at least one differential coil in series with the load and said sensing means senses the current in the shunt field coil to maintain said current essentially constant with temperature variations.

4. The power source of claim 3 wherein means are provided for selectively removing said differential coil from the load, and connecting said sensing means to sense the output voltage to maintain said output voltage essentially constant with variations in welding current.

5. The power source of claim 1 wherein said source is a transformer or transformer rectifier combination with a saturable core reactor in series with the output of the transformer and said field coil is the saturating coil of said reactor.

6. The power source of claim 5 including means for sensing the line voltage energizing the transformer, means for amplifying said sensed value, said control means applying both said values to said exciting means for holding said level of energization essentially constant for constant line voltage but varying same in inversely proportional amounts to any line voltage variations whereby as the output voltage of said transformer combination varies with line voltage variations the saturation of said reactor is varied to vary the volt-ampere relationship of the source such that at a given arc current the arc voltage remains essentially constant.

7. The power source of claim 1 wherein said energizing means includes controlled rectifiers and means for controlling the firing angle of said rectifiers relative to an energizing alternating current source, and said field coil has a series resistance and a diode in parallel with the field coil and the resistance, said sensing means are connected to said resistance, said diode having polarity opposite to the controlled rectifier polarity.

8. A power supply for electric arc welding comprising in combination a rotating generator having an armature, at least a shunt field winding, and at least a series differential winding, and at least a pair of output terminals, said armature being connected to said output terminals in series with said series differential winding, a controllable variable voltage power source for energizing said shunt field winding, said power source including means for sensing the current in said shunt field winding and circiut means responsive to said sensed value for maintaining said shunt field winding current essentially constant at any adjusted value.

9. The generator of claim 8 wherein the maximum open circuit voltage is between 80 and 110 volts.

10. The power supply of claim 8 wherein said controllable variable voltage power source has means for sensing the output voltage of said generator and means responsive to said output voltage for varying the shunt field current to maintain the output voltage essentially constant.

11. The power supply of claim 10 wherein the maximum open circuit voltage is between 80 and 110 volts.

12. The power supply of claim 10 wherein said armature is connected directly to a pair of constant voltage output terminals, i.e. bypassing the series differential winding.

13. The power supply of claim 8 wherein said shunt field winding power source includes an adjustable source of reference and means for comparing at least a portion of the said shunt field current with said reference and means for amplifying the differences between said shunt field current and said reference and means for employing said amplified difference to change said shunt field current so that the difference between the reference and the portion of the shunt field current always are essentially the same.

14. The combination of claim 8 wherein said power source includes means for sensing said generator output voltage, means for optionally switching said responsive means to either of said sensing means whereby said generator may have a regulated constant output voltage with load or a constant open circuit voltage with line voltage or temperature variation.

15. The power supply of claim 4 wherein the output voltage sensed is the output voltage across the terminals including the series differential winding which are selectively placed in series with the load.

16. The power supply of claim 14 wherein the output voltage sensed is the voltage across the armature output terminals and the output power is taken from the armature output i.e. by passing the series differential field.

17. The power supply of claim 8 wherein said power source for said field winding includes controlled rectifiers energized from an A.C. power source and which pass only a portion of the A.C. cycle, said means for sensing a voltage proportional to the field current includes a resistance in series with the field winding the output of said rectifiers and a diode connected in shunt across said field winding and resistance of a polarity opposite to the rectifier polarity.

18. A power supply for electric arc welding comprising in combination a transformer for converting line voltage to a desired arc welding voltage, a variable inductive reactance comprising a welding current winding in series with the output of said transformer, and a magnetically permeable core and a control winding for at least partially saturating said core, power means for adjustably energizing said current winding, means for sensing the control current and automatically holding said current essentially constant to any adjusted value.

19. The power supply of claim 18 including means for sensing at least a portion of said line voltage, and automatically and inversely varying the essentially constant current in the control winding in relation to changes in the line voltage.

20. The power supply of claim 18 wherein a rectifier is provided on the output of said transformer reactor combination for converting said voltage to D.C.

21. A power supply for electric arc welding comprising in combination a transformer for converting line voltage to a desired arc welding voltage, a variable inductive reactance comprising a welding current winding in series with the output of said transformer, and a magnetically permeable core and a control winding for at least partially saturating said core, power means for adjustably energizing said current winding, means for sensing the output voltage and automatically varying said current to hold said voltage essentially constant at any adjusted value.

22. The combination of claim 21 wherein a rectifier is positioned between said transformer and said welding current winding.

References Cited

UNITED STATES PATENTS 2,781,486  2/1957  Gilchrist _____ 322—64 X
3,394,240  7/1968  Broomhall _____ 219—110

ORIS L. RADER, Primary Examiner

H. HUBERFELD, Assistant Examiner

U.S. Cl. X.R.

219—133, 135; 322—28, 64, 70, 73